United States Patent
Peterson et al.

(10) Patent No.: US 10,291,279 B2
(45) Date of Patent: *May 14, 2019

(54) DROP COUNTERMEASURES FOR ELECTRONIC DEVICE

(71) Applicant: Apple Inc., Cupertino, CA (US)

(72) Inventors: Carl R. Peterson, Los Gatos, CA (US); Justin R. Wodrich, Los Gatos, CA (US); Kevin D. Gibbs, Woodside, CA (US); Samuel G. Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,137

(22) Filed: Feb. 7, 2018

(65) Prior Publication Data

US 2018/0167100 A1 Jun. 14, 2018

Related U.S. Application Data

(60) Continuation of application No. 15/652,577, filed on Jul. 18, 2017, now Pat. No. 9,929,767, which is a continuation of application No. 15/230,793, filed on Aug. 8, 2016, now Pat. No. 9,749,000, which is a
(Continued)

(51) Int. Cl.
*G01L 5/00* (2006.01)
*H04M 1/18* (2006.01)
*G01P 3/486* (2006.01)
*G01P 3/488* (2006.01)
(Continued)

(52) U.S. Cl.
CPC .......... *H04B 1/3888* (2013.01); *H04M 1/185* (2013.01); *F16F 15/067* (2013.01); *F16F 2230/0023* (2013.01); *G01L 5/0066* (2013.01); *G01P 3/486* (2013.01); *G01P 3/488* (2013.01); *H04M 2250/12* (2013.01)

(58) Field of Classification Search
CPC ................ H04B 1/3888; H04M 1/185; H04M 2250/12; G01L 5/0066; G01P 3/486; G01P 3/488; F16F 15/067; F16F 2230/0023
See application file for complete search history.

(56) References Cited

U.S. PATENT DOCUMENTS

| | | |
|---|---|---|
| 2,171,808 A | 9/1939 | Von Schlippe |
| 2,989,869 A | 6/1961 | Hanggi |
| 3,606,296 A | 9/1971 | Chassagne |

(Continued)

FOREIGN PATENT DOCUMENTS

| | | |
|---|---|---|
| CN | 1458804 | 11/2003 |
| CN | 2710238 | 7/2005 |

(Continued)

*Primary Examiner* — Joseph H Feild
*Assistant Examiner* — Rufus C Point
(74) *Attorney, Agent, or Firm* — David K. Cole

(57) ABSTRACT

An electronic device comprises a housing, a motion sensor configured to sense motion of the housing, and a processor configured to determine an impact geometry based on the motion. A countermeasure system comprises an actuator coupled to an actuated member. The actuated member is operable by the actuator to modify the impact geometry, so that impact energy is redirected away from an impact sensitive component of the electronic device to an energy absorbing component of the electronic device.

20 Claims, 8 Drawing Sheets

Related U.S. Application Data division of application No. 13/794,393, filed on Mar. 11, 2013, now Pat. No. 9,432,492.

(51) Int. Cl.
   *F16F 15/067* (2006.01)
   *H04B 1/3888* (2015.01)

(56) References Cited

U.S. PATENT DOCUMENTS

| | | | |
|---|---|---|---|
| 3,772,923 A | 11/1973 | Burt | |
| 3,919,575 A | 11/1975 | Weber et al. | |
| 4,278,726 A | 7/1981 | Wieme | |
| 4,288,051 A | 9/1981 | Göschel | |
| 4,314,735 A * | 2/1982 | Fullenkamp | H01R 13/633 248/346.11 |
| 4,370,894 A | 2/1983 | Sturesson et al. | |
| 4,580,456 A | 4/1986 | Takano | |
| 4,849,580 A | 7/1989 | Reuter | |
| 4,940,336 A | 7/1990 | Dryga et al. | |
| 5,182,158 A | 1/1993 | Schaeffer | |
| 5,349,893 A | 9/1994 | Dunn | |
| 5,368,914 A | 11/1994 | Barrett | |
| 5,426,562 A | 6/1995 | Morehouse et al. | |
| 5,507,665 A * | 4/1996 | Oda | H01R 13/641 439/357 |
| 5,587,854 A | 12/1996 | Sato et al. | |
| 5,606,341 A | 2/1997 | Aguilera | |
| 5,659,376 A | 8/1997 | Uehara et al. | |
| 5,666,261 A | 9/1997 | Aguilera | |
| 5,783,297 A | 7/1998 | Wise et al. | |
| 5,909,074 A | 6/1999 | Takaya et al. | |
| 5,936,600 A | 8/1999 | Ohashi et al. | |
| 5,965,249 A | 10/1999 | Sutton et al. | |
| 5,982,617 A | 11/1999 | Haley et al. | |
| 6,154,360 A | 11/2000 | Kaczeus et al. | |
| 6,262,888 B1 | 7/2001 | Siedow et al. | |
| 6,288,489 B1 | 9/2001 | Isohata et al. | |
| 6,323,757 B1 | 11/2001 | Nagai | |
| 6,324,054 B1 | 11/2001 | Chee et al. | |
| 6,373,702 B2 | 4/2002 | Oishi et al. | |
| 6,483,926 B1 * | 11/2002 | Yamashita | G10K 11/1788 381/71.14 |
| 6,524,692 B1 | 2/2003 | Rosen | |
| 6,603,620 B1 | 5/2003 | Berding | |
| 6,596,976 B2 | 7/2003 | Lin et al. | |
| 6,627,818 B2 | 9/2003 | Kamel et al. | |
| 6,633,481 B2 | 10/2003 | Pavol | |
| 6,647,328 B2 | 11/2003 | Walker | |
| 6,664,491 B2 | 12/2003 | Yanai et al. | |
| 6,665,192 B2 | 12/2003 | Wimberger Friedl et al. | |
| 6,744,186 B2 | 6/2004 | Oishi | |
| 6,809,916 B2 | 10/2004 | Nakata et al. | |
| 6,859,357 B2 | 2/2005 | Morimoto et al. | |
| 6,924,996 B2 | 8/2005 | Sugawara | |
| 6,968,954 B2 | 11/2005 | Hsieh | |
| 7,009,835 B2 | 3/2006 | Desai et al. | |
| 7,059,182 B1 * | 6/2006 | Ragner | H05K 5/0086 73/200 |
| 7,064,655 B2 | 6/2006 | Murray et al. | |
| 7,094,094 B2 | 8/2006 | Zahnen et al. | |
| 7,113,351 B2 | 9/2006 | Hovanky | |
| 7,133,281 B2 | 11/2006 | Bae | |
| 7,161,580 B2 | 1/2007 | Bailey et al. | |
| 7,167,360 B2 | 1/2007 | Inoue et al. | |
| 7,259,357 B2 | 8/2007 | Walker | |
| 7,260,885 B2 | 8/2007 | Albrecht et al. | |
| 7,369,345 B1 | 5/2008 | Li et al. | |
| 7,373,863 B2 | 5/2008 | O'Banion et al. | |
| 7,375,645 B2 * | 5/2008 | Tsai | G01L 5/0052 340/665 |
| 7,382,567 B2 | 6/2008 | Liao et al. | |
| 7,393,575 B2 | 7/2008 | Boss | |
| 7,450,332 B2 | 11/2008 | Pasolini et al. | |
| 7,463,436 B2 | 12/2008 | Takahashi et al. | |
| 7,477,469 B2 | 1/2009 | Cook et al. | |
| 7,492,544 B2 | 2/2009 | Jeansonne et al. | |
| 7,532,478 B2 | 5/2009 | Jeong | |
| 7,549,335 B2 * | 6/2009 | Inoue | G01P 3/22 360/75 |
| 7,554,798 B2 | 6/2009 | Tanokuchi et al. | |
| 7,568,942 B1 | 8/2009 | Lannon et al. | |
| 7,578,691 B2 * | 8/2009 | Weksler | H01R 13/6278 439/304 |
| 7,607,610 B1 * | 10/2009 | Sterchak | B64C 33/02 244/11 |
| 7,612,994 B2 | 11/2009 | Ulrich et al. | |
| 7,619,891 B2 | 11/2009 | Woo et al. | |
| 7,643,243 B2 | 1/2010 | Lee et al. | |
| 7,652,892 B2 | 1/2010 | Shiu et al. | |
| 7,660,107 B2 | 2/2010 | Leung | |
| 7,684,183 B2 | 3/2010 | Mori et al. | |
| 7,760,289 B2 | 7/2010 | Nakanishi et al. | |
| 7,817,373 B2 | 10/2010 | Choi et al. | |
| 7,839,051 B2 | 11/2010 | Klinghult | |
| 7,855,892 B2 | 12/2010 | Lin | |
| 7,919,945 B2 | 4/2011 | Houston | |
| 8,075,981 B2 | 12/2011 | Pearce et al. | |
| 8,093,811 B2 | 1/2012 | Tanokuchi et al. | |
| 8,106,789 B2 | 1/2012 | Yang et al. | |
| 8,144,453 B2 | 3/2012 | Brown et al. | |
| 8,189,280 B2 | 5/2012 | Ollila et al. | |
| 8,190,015 B2 | 5/2012 | Lin et al. | |
| 8,240,777 B2 | 8/2012 | Prest | |
| 8,248,777 B2 | 8/2012 | Prest | |
| 8,275,420 B2 | 9/2012 | Lim | |
| 8,289,689 B2 | 10/2012 | Chen et al. | |
| 8,289,715 B2 | 10/2012 | Takahara | |
| 8,305,744 B2 | 11/2012 | Shedletsky et al. | |
| 8,330,305 B2 * | 12/2012 | Hart | H04M 1/185 307/650 |
| 8,352,077 B2 | 1/2013 | Goswami et al. | |
| 8,368,641 B2 | 2/2013 | Tremblay et al. | |
| 8,411,432 B1 | 4/2013 | Zimlin et al. | |
| 8,421,763 B2 * | 4/2013 | Liao | G06F 1/1616 345/173 |
| 8,430,381 B2 * | 4/2013 | Chen | G06F 1/1601 267/140 |
| 8,446,475 B2 | 5/2013 | Topliss et al. | |
| 8,467,133 B2 | 6/2013 | Miller | |
| 8,485,053 B2 | 7/2013 | Lee et al. | |
| 8,503,121 B2 | 8/2013 | Osaka et al. | |
| 8,564,424 B2 | 10/2013 | Evarts et al. | |
| 8,749,958 B2 * | 6/2014 | Li | F16F 15/067 267/136 |
| 8,798,534 B2 | 8/2014 | Rodriguez et al. | |
| 8,862,182 B2 * | 10/2014 | Shukla | H02K 41/0356 340/439 |
| 8,872,448 B2 | 10/2014 | Boldyrev et al. | |
| 8,896,995 B2 * | 11/2014 | Shedletsky | F16F 7/1028 345/174 |
| 8,903,519 B2 * | 12/2014 | King | H04M 1/185 700/79 |
| 9,167,061 B2 | 10/2015 | Shuster | |
| 9,432,492 B2 * | 8/2016 | Peterson | H04B 1/3888 |
| 2005/0017396 A1 | 1/2005 | Pearce et al. | |
| 2005/0130583 A1 | 6/2005 | Troutman | |
| 2006/0109581 A1 | 5/2006 | Li et al. | |
| 2006/0152842 A1 * | 7/2006 | Pasolini | G01P 15/0891 360/75 |
| 2006/0236761 A1 * | 10/2006 | Inoue | G01P 3/22 73/510 |
| 2006/0268447 A1 * | 11/2006 | Liao | G01P 15/0891 360/75 |
| 2007/0106483 A1 * | 5/2007 | Kelley | G01P 15/0891 702/141 |
| 2007/0109679 A1 * | 5/2007 | Han | G11B 5/6005 360/75 |
| 2007/0178771 A1 * | 8/2007 | Goetz | H01R 13/2428 439/669 |
| 2007/0253093 A1 * | 11/2007 | Cook | G11B 19/04 360/75 |
| 2008/0024972 A1 | 1/2008 | Yamaguchi | |

(56) References Cited

U.S. PATENT DOCUMENTS

| | | |
|---|---|---|
| 2008/0091309 A1 | 4/2008 | Walker |
| 2008/0163716 A1* | 7/2008 | Battlogg ............... B62D 1/192 74/493 |
| 2008/0192124 A1 | 8/2008 | Nagasaki |
| 2009/0219130 A1* | 9/2009 | Dai ......................... B63C 9/18 340/3.1 |
| 2009/0273480 A1 | 11/2009 | Mittleman et al. |
| 2010/0149073 A1 | 6/2010 | Chaum et al. |
| 2010/0157515 A1* | 6/2010 | Tseng .................... H04M 1/185 361/679.02 |
| 2010/0164152 A1 | 7/2010 | Li |
| 2010/0188243 A1* | 7/2010 | Tysowski ............... G08B 21/24 340/669 |
| 2010/0272969 A1 | 10/2010 | Taylor |
| 2011/0040410 A1 | 2/2011 | Kim et al. |
| 2011/0132114 A1 | 6/2011 | Siotis |
| 2011/0194230 A1* | 8/2011 | Hart ...................... H04M 1/185 361/437 |
| 2011/0228460 A1 | 9/2011 | Kim et al. |
| 2011/0257765 A1 | 10/2011 | Evans et al. |
| 2011/0279961 A1* | 11/2011 | Shedletsky ........... F16F 7/1028 361/679.21 |
| 2012/0136573 A1* | 5/2012 | Janardhanan ........ G01C 21/165 701/512 |
| 2012/0212484 A1 | 8/2012 | Haddick et al. |
| 2012/0212499 A1 | 8/2012 | Haddick et al. |
| 2012/0234981 A1 | 9/2012 | Nagabhushan et al. |
| 2013/0038278 A1 | 2/2013 | Park et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0090881 A1* | 4/2013 | Janardhanan ........ G01C 22/006 702/104 |
| 2013/0100591 A1 | 4/2013 | Montevirgen et al. |
| 2013/0127980 A1 | 5/2013 | Haddick et al. |
| 2013/0138715 A1* | 5/2013 | Petersen ................. H04M 1/24 709/203 |
| 2013/0218058 A1 | 8/2013 | Ceoldo et al. |
| 2013/0257582 A1 | 10/2013 | Rothkopf et al. |
| 2013/0278631 A1 | 10/2013 | Border et al. |
| 2013/0285490 A1 | 10/2013 | Rothkopf et al. |
| 2014/0260723 A1 | 9/2014 | Ely et al. |
| 2014/0273607 A1* | 9/2014 | Orand ................... H01R 13/05 439/447 |
| 2014/0298910 A1* | 10/2014 | Simoni ................. G01P 15/125 73/514.32 |
| 2015/0301565 A1 | 10/2015 | Manullang et al. |
| 2016/0154439 A1 | 6/2016 | Rothkopf et al. |
| 2016/0284497 A1 | 9/2016 | Stryker |
| 2016/0344440 A1 | 11/2016 | Peterson |

FOREIGN PATENT DOCUMENTS

| | | |
|---|---|---|
| CN | 2794023 | 7/2006 |
| CN | 201230310 | 4/2009 |
| CN | 102857589 | 1/2013 |
| EP | 1057504 | 12/2000 |
| GB | 715773 | 9/1954 |
| GB | 1133198 | 11/1968 |
| JP | 2011099758 | 5/2011 |
| KR | 2004036970 | 5/2004 |
| TW | 501329 | 7/1893 |
| TW | I303192 | 11/2008 |
| WO | WO2010/135421 | 11/2010 |

* cited by examiner

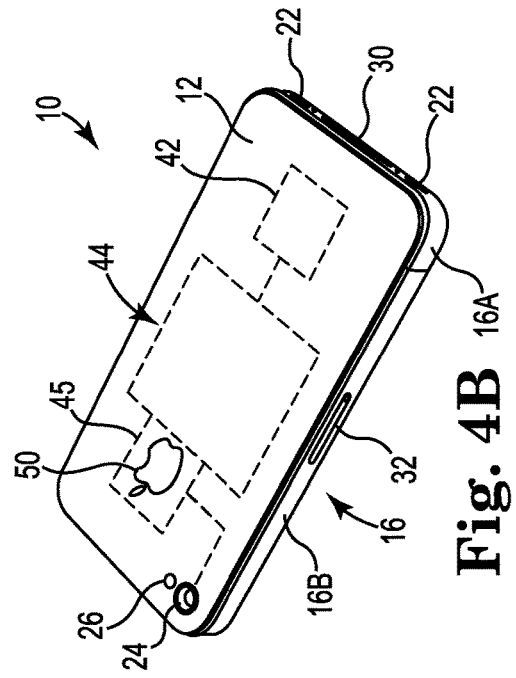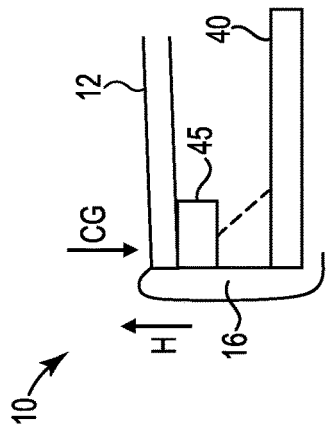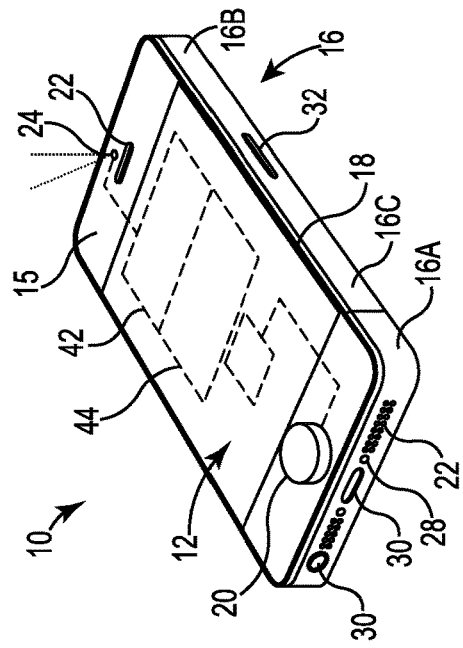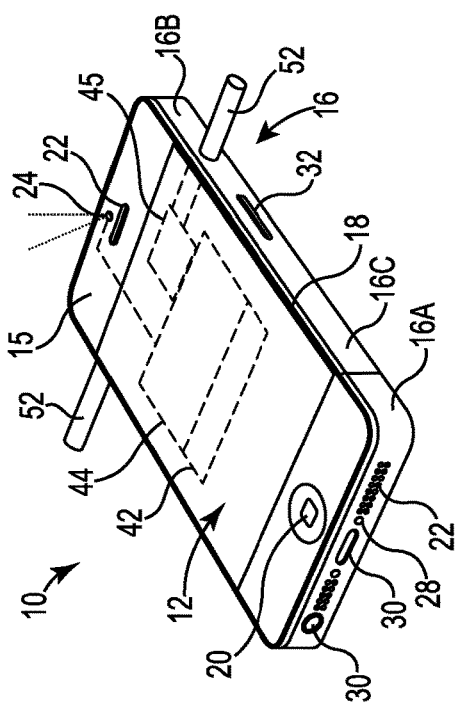

DROP COUNTERMEASURES FOR ELECTRONIC DEVICE

This application is a continuation of U.S. patent application Ser. No. 15/652,577, filed Jul. 18, 2017, which is a continuation of U.S. patent application Ser. No. 15/230,793, filed Aug. 8, 2016, now U.S. Pat. No. 9,749,000, which is a division of U.S. patent application Ser. No. 13/794,393, filed Mar. 11, 2013, now U.S. Pat. No. 9,432,492, which are hereby incorporated by reference in their entireties.

TECHNICAL FIELD

This subject matter of this disclosure relates generally to electronic devices, and specifically to active protection systems for devices subject to potential hazards including dropping, shock, and impact. In particular, the disclosure relates to active countermeasure and damage mitigation systems suitable for a range of different electronic devices, including, but not limited to, mobile and cellular phones, smartphones, tablet computers, personal computers, personal digital assistants, media players, and other electronic devices.

BACKGROUND

In use, modern electronic devices are subject to a wide range of different environmental effects, including temperature extremes, humidity, physical contamination, and potential loss or damage due to physical hazards including dropping, shock, compression and impact. These considerations can be particularly relevant to portable electronic and mobile device applications, where sensitive control and display components may be exposed to the external environment, increasing the risk of damage due to accident or misuse.

A number of alternatives have been advanced to address these concerns, but there remains a need for improved techniques suitable for advanced consumer electronics and other digital device applications, without all the limitations of the prior art. In particular, there is a need for active drop damage mitigation and impact countermeasure systems, suitable for modern electronic devices designed for an ever-wider range of operating environments, and exposed to a correspondingly wider range of environmental risk factors, including dropping, shock, compression, impact, and other potentially adverse operational effects.

SUMMARY

This disclosure relates to drop damage mitigation and impact countermeasures for electronic devices. In various examples and embodiments, the electronic device includes a housing, a motion sensor configured to sense motion of the housing, and a processor configured to determine an impact geometry based on the motion.

The countermeasure system may include an actuator coupled to an actuated member, where the actuated member is operable by the actuator to modify the impact geometry. As a result, impact energy can be redirected from an impact sensitive component of the electronic device to an energy absorbing component of the electronic device.

Depending on application, a proximity detector may be configured to sense proximity of a potential impact surface external to the device, and the processor may be configured to determine the impact geometry based on the proximity of the external surface. For example, the proximity detector may include a camera, and the processor may be configured to determine the proximity of the external surface based on image data from the camera. The motion sensor may also include an accelerometer, and the processor may be configured to determine the impact geometry based on acceleration of the housing, with respect to the external surface.

In some examples, the actuated member may include a mass operable to adjust the impact geometry by changing an attitude of the housing, with respect to the external surface. The mass may be coupled to an unstable rotational axis, and the processor may be configured to adjust the attitude of the housing by repeated operation of the actuator in different directions, imparting angular momentum to the device in different directions about the unstable axis during tumbling motion.

The actuated member may also be operable to change the impact geometry by extending in a proud relationship from the housing of the electronic device, so that the impact energy is redirected from the housing to the actuated member. For example, the actuated member may include a logo configured to identify the electronic device, or a control member configured to control operation of the electronic device, and operable by the actuator to extend in a proud relationship from a cover glass so that the impact energy is redirected from the cover glass to the logo or control member.

The actuated member can also include the cover glass, operable by the actuator to depress into a recessed relationship with respect to the housing of the electronic device, so that the impact energy is redirected from the cover glass to the housing. Alternatively, the actuated member may include a connector coupling operable to retain or release a connector, based on the motion of the housing, or a cover panel operable to cover the cover glass so that the impact energy is redirected from the cover glass to the cover panel.

Exemplary methods of operation include sensing motion of a housing for an electronic device, determining an impact geometry based on the motion, and operating an actuator to modify the impact geometry. For example, an actuated member may be actuated to redirect impact energy from an impact sensitive component of the electronic device to an energy absorbing component of the electronic device.

Depending on application, operation may also include sensing proximity of a potential impact surface external to the housing of the electronic device, where the impact geometry is determined based on the proximity of the external surface. For example, sensing proximity of the external surface may include processing image data from a camera, in order to determine proximity.

Where the actuated member comprises a mass coupled to an unstable rotational axis of the device, modifying the impact geometry may include coupling the actuated member or mass to the unstable rotational axis, in order to change an attitude of the housing with respect to the external surface. For example, changing the attitude of the housing may include repeated actuation of the mass to impart angular momentum in different directions about the unstable axis, during tumbling motion of the electronic device.

Operating the actuator may also include extending the actuated member in a proud relationship from the housing of the electronic device, in order to redirect the impact energy from the housing to the actuated member. For example, the actuated member may be extended in a proud relationship from a cover glass of the electronic device, in order to redirect the impact energy from the cover glass to the actuated member. Alternatively, the cover glass may be depressed into a recessed relationship with respect to the housing of the electronic device, in order to redirect the impact energy from the cover glass to the housing.

In additional examples, operating the actuator may include retaining or releasing an external connector, based on the motion of the housing. Alternatively, a cover panel may be deployed over the cover glass of the electronic device, in order to redirect the impact energy from the cover glass to the cover panel.

BRIEF DESCRIPTION OF THE DRAWINGS

FIG. 4A is a schematic illustration of a drop damage mitigation system for h device, with an actuated control device.

FIG. 4B is a schematic illustration showing a second example of the drop damage mitigation system, with an actuated logo member.

FIG. 4C is a schematic illustration showing a third example of the drop damage mitigation system, with an actuated impact absorbing member.

FIG. 4D is a schematic illustration showing a fourth example of the drop damage mitigation system, with an actuated cover glass.

DETAILED DESCRIPTION

Figure 1A:
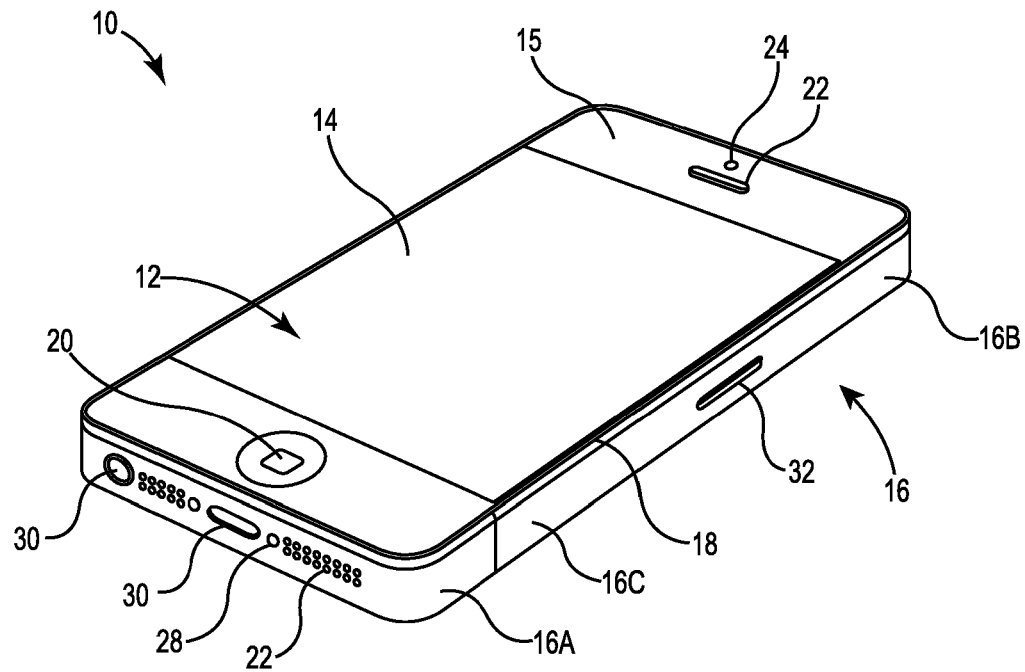
FIG. 1A is a front perspective view of a digital electronic device with active drop damage mitigation and impact countermeasures.
Figure 1B:
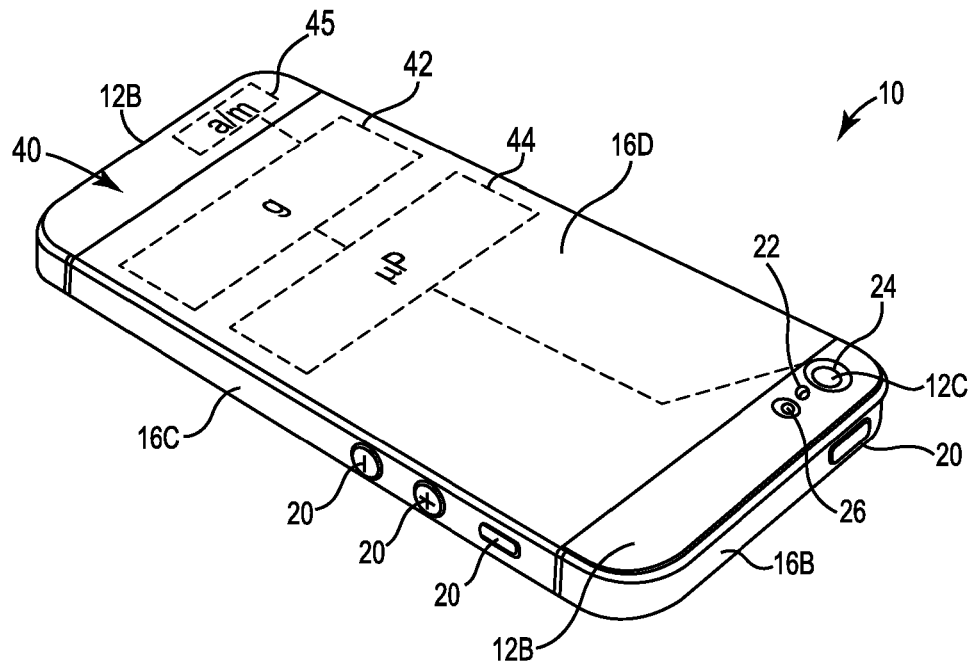
FIG. 1B is a rear perspective view of the device.

FIG. 1A is a perspective view of digital electronic device 10, in a communications embodiment. FIG. 1B is a rear perspective view of device 10, as shown in FIG. 1A. In these particular configurations, device 10 includes front cover glass 12 with display window 14 defined between borders 15, and housing assembly 16 is configured for use as a mobile phone or smartphone application. Alternatively, device 10 may be configured as a media player, digital assistant, tablet computer, personal computer, computer display, or other electronic device, in either portable or stationary form.

Cover glass 12 is typically formed of a glass or transparent ceramic material, for example silica glass or an aluminum oxide or sapphire material, or a clear plastic polymer such as acrylic or polycarbonate. Housing 16 and frame 18 may be formed of metals such as aluminum and steel, or from plastic, glass, ceramic, or composite materials, and combinations thereof.

As shown in FIGS. 1A and 1B, front cover glass 12 may be coupled to top, bottom, and middle sections 16A, 16B, and 16C of housing assembly 16, for example utilizing a bezel or frame assembly 18. Middle housing section 16C extends across the back surface of device 10, forming back plate (or middle plate) 16D, between back cover glass insets 12B, as shown in FIG. 1B.

Additional cover glass components such as lens cover 12C may also be provided. Alternatively, a single back cover glass section 12 (or 12B) may be used. Middle plate 16D may also be extended to cover substantially the entire back surface of device 10, providing a substantially unitary configuration for the back cover of housing 16.

Display window 14 is typically configured for a touch screen or other display component, as defined between border region(s) 15 of cover glass 12. Depending on configuration, cover glass 12 and housing 16 may also accommodate additional control and accessory features, including, but not limited to, home, menu and hold buttons, volume controls, and other control devices 20, audio (e.g., speaker or microphone) features 22, sensor and camera features 24, lighting and indicator (e.g., light emitting diode or flash) features 26, mechanical fasteners 28, connector ports 30, and access ports 32, e.g., for a subscriber identity module or SIM card, a flash memory device, or other internal component of electronic device 10.

As shown in FIG. 1B, device 10 also includes countermeasure system 40, as configured to mitigate damage from dropping, impact, and other accident or misuse. In this particular configuration, for example, countermeasure system 40 includes a gyro, accelerometer, magnetic sensor, or other motion sensor (g) 42 for sensing motion of housing 16, and processor (µp) 44 for determining or predicting impact geometry, based on the motion. Countermeasure system 40 may also include one or more cameras or other proximity sensors 24.

In operation of system 40, actuator or actuated mass (aim) 45 is operable to reduce or mitigate impact damage to device 10, or the potential therefor. In particular, actuator 45 may be operated to change the impact geometry by repositioning the actuated mass to alter the attitude of housing 16, or by reconfiguring or actuating a component of housing 16. As a result, impact forces and impact energy may be redirected from sensitive components of device 10 to energy absorbing components, as described below.

Figure 2:
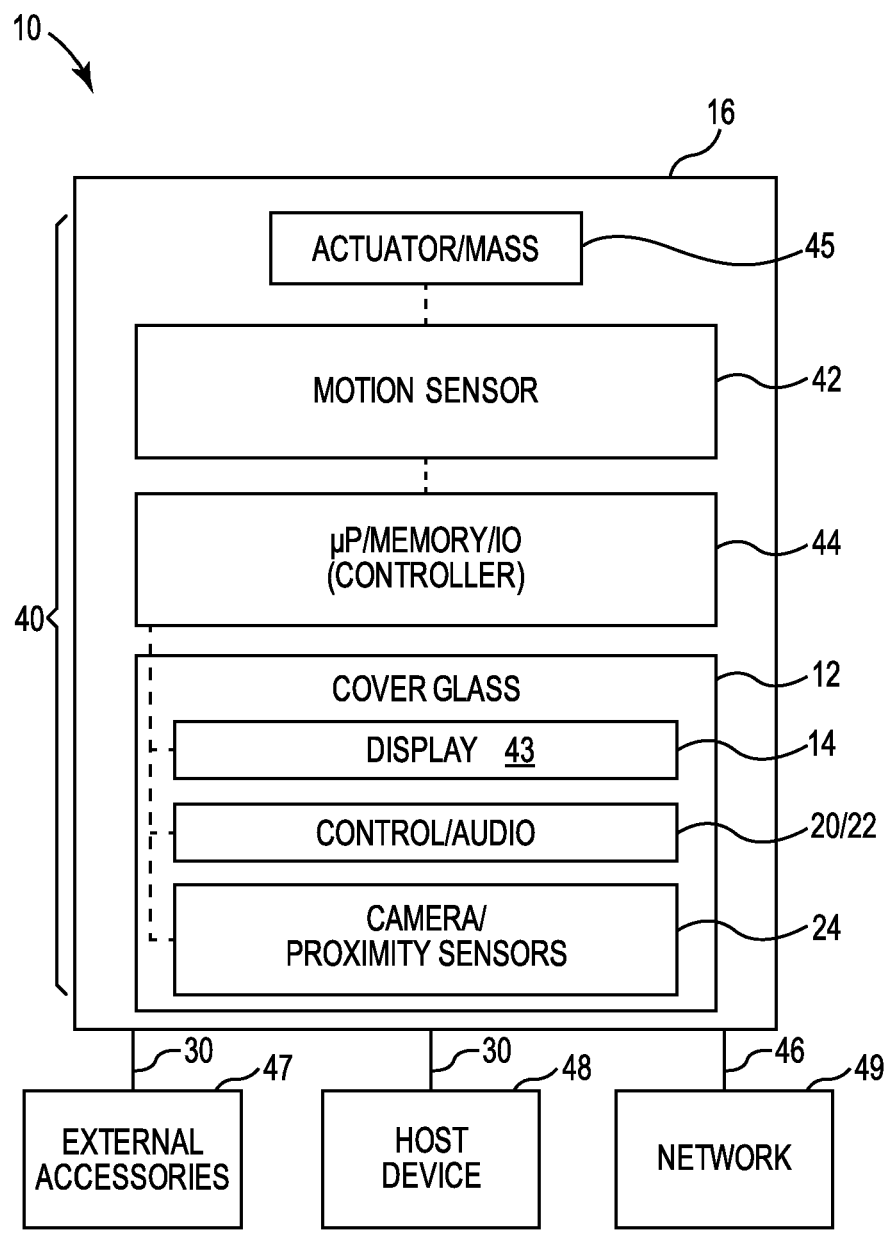
FIG. 2 is a block diagram illustrating internal and external features of the device.

FIG. 2 is a block diagram illustrating various internal and external components of electronic device 10, including drop damage mitigation and impact countermeasure system 40. In this particular example, system 40 includes an accelerometer or other motion sensor 42, display 43, processor or controller 44, and actuator 45.

In addition, electronic device 10 and system 40 may also include various control mechanisms 20 and audio devices 22, cameras and other proximity sensors 24, and additional lighting, indicator, connector, and access features 26, 30, and 32, as variously disposed and provided within cover glass 12 and housing 16. Device 10 thus encompasses a range of different electronics applications, as described above with respect to FIGS. 1A and 1B, as well as additional hybrid devices including smartphones with media player capabilities, game players, remote global positioning and telecommunications devices, and laptop, desktop, notebook, handheld and ultraportable computer devices and displays.

Processor/controller 44 includes microprocessor (μp) and memory components configured to execute a combination of operating system and application firmware and software, in order to control device 10 with countermeasure system 40, and to provide various additional functionality including, but not limited to, voice communications, voice control, media playback and development, internet browsing, email, messaging, gaming, security, transactions, navigation, and personal assistant functions. As shown in FIG. 2, processor/controller 44 is electronically coupled in signal and data communication with motion sensor 42, display 43, actuator 45, control and audio devices 20 and 22, and cameras and proximity sensors 24. Processor/controller 44 may also include communications interface and other input-output (IO) devices configured to support connections 30 and 46, with various hard-wired, wireless, audio, visual, infrared (IR), and radio frequency (RF) connections to one or more external accessories 47, host devices 48 and networks 49.

When electronic device 10 is subject to dropping, impact, or other potential hazard, motion and proximity data are acquired from one or more sensor systems including, but not limited to, cameras and other proximity sensors 24, and accelerometers, gyros, and other motion sensors 42. The data are analyzed by processor components such as processor/controller 44, in order to apply suitable countermeasures to lessen the potential for damage to device 10, for example via operation of actuator 45. Alternatively, system 40 may also deploy or operate one or more auxiliary devices 20, 22, 24, and 26, or connector ports 30, either independently or in combination with actuator 45.

Suitable countermeasures can include moving one or more devices 20, 22, 24 or 26, to a more favorable impact position, for example through shifting or rotating elements of the various control, audio, camera, lighting, and sensor systems. Alternatively, actuator 45 may be employed to shift or rotate a particular mass, in order to change the orientation of device 10 via momentum coupling to housing 16. Additional options include protective countermeasures to change the impact severity, for example by actuating or pulling cover glass 12 sub flush or below the perimeter of housing 16, closing a cover system, deploying an airbag system or other energy absorbing device, or changing the shape or material properties of one or both of cover glass 12 and housing 16, in order to provide shock and energy absorbing properties, based the various embodiments and examples described below.

Figure 3A:
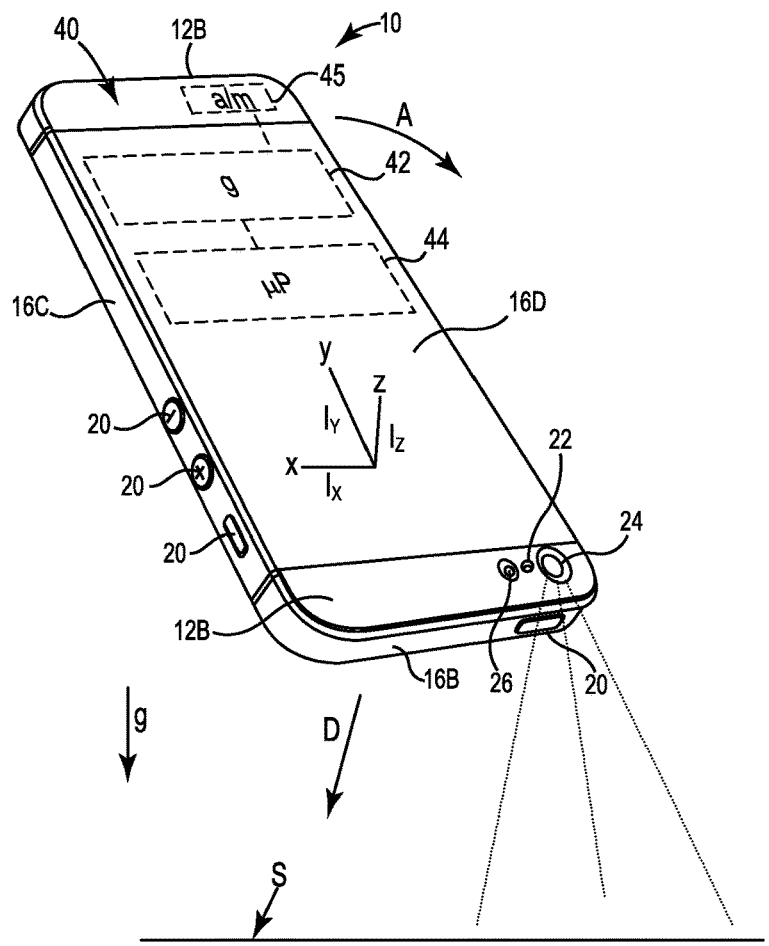
FIG. 3A is a perspective view illustrating a momentum-coupled drop damage mitigation or countermeasure system for the device, with a proximity sensor.

FIG. 3A is a perspective view illustrating a momentum-coupled drop damage mitigation or countermeasure system 40 for device 10, with proximity sensor 24. As shown in FIG. 3A, device 10 may experience a dropped or falling condition in direction D, with arbitrary three-dimensional rotational attitude A. The direction of motion (D) and attitude (A) may be determined with respect to local gravitational field vector g or potential impact surface S, or based on another arbitrary reference system.

In this particular example, countermeasure system 40 includes a gyro, accelerometer, or other motion sensor (g) 42, processor (μp) 44, actuator/actuated mass 45, and proximity sensor 24. Processor 44 determines attitude A, and motion D, including velocity and angular rotation data, based on signals from one or both of proximity sensor 24 and motion sensor 42.

For example, motion sensor 42 may provide angular rotation and acceleration data with respect to local gravitational field g, and proximity sensor 24 may provide position, velocity, and attitude information with respect to potential impact surface S, or other external reference. Suitable technologies for proximity sensor 24 include general-purpose cameras and other dedicated-use proximity detectors 24, for example and infrared, optical, and ultrasonic systems.

Alternatively, one or more audio components 22 may be utilized for proximity detection, for example by emitting a chirp or ultrasonic pulse, and determining height, speed, and orientation based on the reflected signal or "bounce" from nearby surfaces. Potential ultrasonic or audio sensing techniques could utilized data not only from the ground or other impact surface, but also signals from walls, ceilings, furniture, and even the user or other nearby objects.

In camera-based embodiments of proximity sensor 24, processor 44 may utilize motion capture software or firmware in order to convert image data from sensor 24 to velocity, attitude, and positional data. Alternatively, other software and firmware systems may be utilized to determine motion D, attitude A, and the proximity of external surface S, based on data from one or both of proximity sensor 24 and motion sensor 42.

In operation of countermeasure system 40, processor 44 determines a potential hazard damaging event for device 10 based on data from one or both sensors 24 and 42, for example by predicting an impact geometry for housing 16 on surface S, based on motion data from motion sensor 42 and proximity data from proximity sensor 24. In addition, processor 44 may also predict attitude A of housing 16 on impact, based on rotational velocity and other data from one or both sensors 24 and 42.

Based on the impact geometry, as determined by processor 44, actuator 45 is operable to provide a particular momentum coupling or modification to housing 16, for example by linear actuation of a mass m, in order to change the rotational velocity and angular momentum of housing 16 prior to impact. For example, processor 44 may operate actuator 45 to change attitude A of housing 16 with respect to surface S, in order to redirect impact energy from cover glass 12 (e.g., at a corner or other impact-sensitive area), to a less sensitive surface or component of housing 16, such as the back of device 10, or another energy absorbing surface.

Figure 3B:
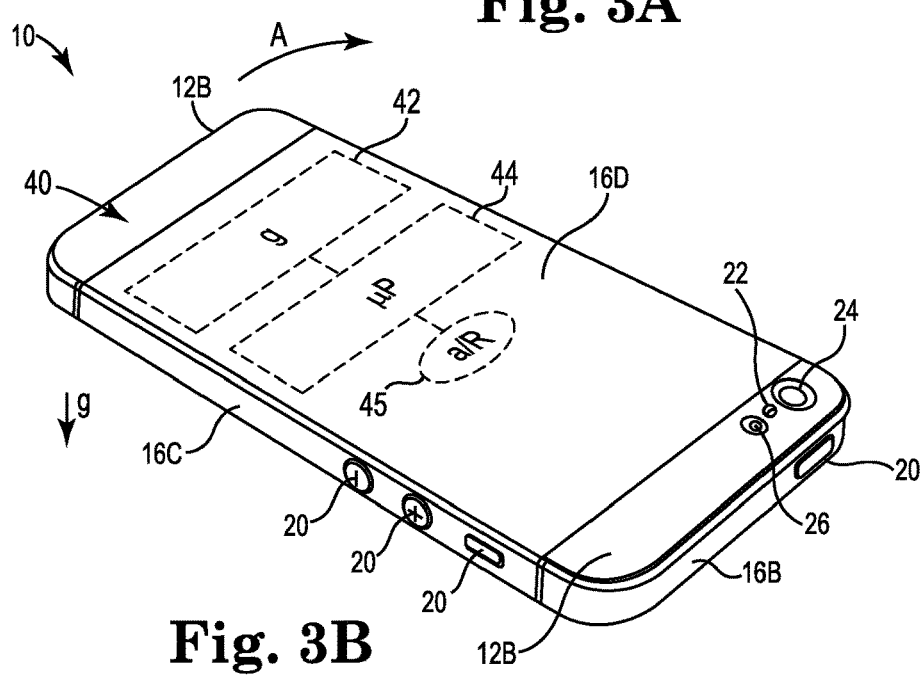
FIG. 3B is a schematic view illustrating a second example of the countermeasure system, with a rotary angular momentum-coupled actuator.

FIG. 3B is a perspective view illustrating a second example of countermeasure system 40, with a rotary angular momentum coupled actuator (a/R) 45. In this example, actuator 45 spins up (or down) a disk or other rotational component R, in order to change the angular momentum of housing 16, as a fraction of the total angular momentum of device 10.

Depending on embodiment, actuator 45 may operate a dedicated (linearly actuated) mass m or (rotationally actuated) component R, or another component of device 10, for example a camera lens, speaker element, vibration motor, disk drive, or other component of a control device or control mechanism 20, audio device 22, camera or sensor 24, or lighting/indicator feature 26. As a result, attitude A is modified at the predicted point of impact with surface S, or other external surface or object, and impact energy can redirected from one component to another, based on the modified attitude A of housing 16 at impact.

In general, the actuated mass may be relatively small, as compared to the mass of device 10 and housing 16. Nonetheless, even relatively small angular and linear momentum couplings may have a substantial effect on attitude A at impact. This is particularly true for tumbling motions characteristic of a drop or falling event, because the intermediate axis of rotation (that is, the middle moment of $I_x$, $I_y$, and $I_z$) is inherently unstable. Thus, even relatively small changes in the corresponding angular momentum (Lx, Ly, Lz) may have a substantial effect on attitude A, at the predicted time of impact.

Where tumbling motion occurs about an unstable axis, moreover, angular momentum is typically transferred from one axis x, y, z, to another. Thus, actuation of a linear mass m or rotational body R may ultimately result in substantially different angular momentum components Lx, Ly, $L_2$ depending upon timing, particularly when the mass m or rotational body R is coupled with the unstable (intermediate) inertial axis or moment lx, ly, $1_2$. As a result, relatively large effects in ultimate attitude A (e.g., at impact) can be achieved, for example by repeated or pulsed operation of actuator 45, either in the same or different directions, depending upon attitude A and motion D, as determined by controller/processor 44.

FIG. 4A is a schematic illustration showing drop damage mitigation system 40 for electronic device 10, with an actuated control mechanism (or member) 20. In this example, mitigation system 40 includes a camera or other proximal sensor 24, with actuator 45 coupled to control member 20, for example a menu button, home button, or other control mechanism configured to control operation of device 10, as disposed in front (or back) glass 12.

In operation of the exemplary system in FIG. 4A, proximal sensor 24 is utilized to detect an imminent impact, for example a front or back drop event onto a hard surface. System 40 controls actuator 45 based on the predicted impact, as determined by processing data from sensor 24, with or without additional data from a gyro or other motion sensor 42. Actuator 45 is configured to actuate control device 20, for example by positioning the home button or other control surface into a proud relationship with respect to cover glass 12.

As a result, impact energy is redirected from cover glass 12 (or other sensitive components of device 10) to control device or control member 20, which is configured to absorb the impact energy will less likelihood of damage. For example, control device 20 may include a spring-bias control button or other control surface, which prevents face-on impact onto cover glass 12, reducing the risk of damage to cover glass 12. In this configuration, countermeasure system 40 also reduces the likelihood of an air burst or other potentially damaging event for sensitive audio components 22, for example a microphone or speaker cone.

FIG. 4B is a schematic illustration showing a second example of drop damage mitigation system 40, with an actuated logo structure or member 50. In this example, mitigation system 40 includes proximity sensor 24, with actuator 45 coupled to logo member 50 or other actuated member in the back glass or back cover of device 10.

In operation of the exemplary system in FIG. 4B, system 40 determines an impact based on data from one or both of a camera or proximal sensor 24 and motion sensor 42, for example a back drop event. Based on the predicted impact or other potential hazard, processor 44 directs actuator 45 to position logo member 50 in a proud or extended position with respect to cover glass 12 (or other back surface) of device 10, redirecting impact energy to a spring bias element or other energy-absorbing structure in logo member 50, as described above for actuated control member 20 as shown in FIG. 4A.

FIG. 4C is a schematic illustration showing a third example of drop damage mitigation system 40, with an actuated impact absorbing member 52. In this example, mitigation system 40 includes a "stilt" or other (e.g., spring-biased) member 52, which is configured to project from housing 16 when operated by actuator 45.

In operation of the exemplary system in FIG. 4C, processor 44 directs actuator 45 to operate a "stilt" or other projection member 52 in response to a dropping condition or predicted impact, as determined based on data from one or both of proximal sensor 24 and motion sensor 42. Projection member 52 is configured to absorb impact energy, reducing the risk of damage by redirecting the impact energy away from sensitive components of device 10, including, but not limited to, cover glass component(s) 12.

Depending upon embodiment, two or more actuated projections or other impact energy absorbing members 52 may be provided, for example one from each side of housing 16. Projection members 52 may also be combined with other designs for mitigation system 40, for example the actuated control and logo members of FIGS. 4A and 4B, above, or any of the other designs herein. In these combined configurations, different actuated members including, but not limited to, components 20, 22, 24, 26, 30, 50, and 52, may be simultaneously deployed, or individually actuated based on a predicted impact on a particular front, back, or side surface of device 10, as determined by damage mitigation system 40 based on data from one or more proximity and motion sensors 24 and 42.

FIG. 4D is a schematic illustration showing a fourth example of drop damage mitigation system 40, with cover glass protection. In this example, one or more actuators 45 are coupled to cover glass 12, housing 16, or both. Upon determination of a drop condition, impact, or other hazard, damage mitigation system 40 directs actuator to position housing 16 in a proud relationship with respect to cover glass 12, as shown in FIG. 4D, so that impact energy is redirected from cover glass 12 to energy absorbing structures in housing 16.

For example, actuator 45 may be coupled to a piezoelectric or other electro-active material, in order to pull or recess cover glass 12 below the level of housing 16 (see arrow CG). Alternatively, actuator 45 may be coupled to an electro-active polymer or other electro-active material in housing 16, in order to position housing 16 above (proud of) cover glass 12 (see arrow H). In additional examples, actuator 45 provides a combination of both functions, with either individual or joint actuation of housing 16 and cover glass 12, in order to position housing 16 for redirecting impact energy away from cover glass 12, and other sensitive components of device 10.

Figure 5A:
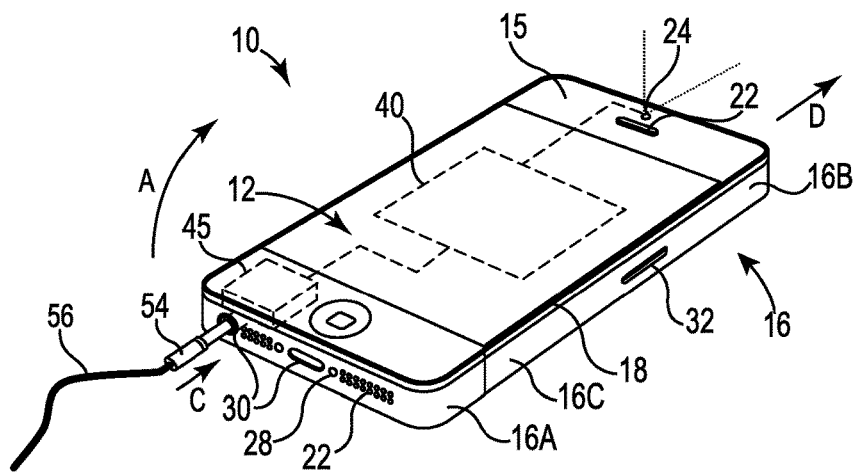
FIG. 5A is a schematic illustration of a mechanically coupled drop damage countermeasure system for the device, with an audio jack or connector coupling.

FIG. 5A is a schematic illustration of a mechanically coupled drop damage countermeasure system for device 10, with audio jack or connector coupling actuator 45. In this example, countermeasure system 40 includes actuator 45 coupled to a headphone jack or other external connector 54, as configured for coupling to device 10 via connector one or more apertures or ports 30.

In operation of the exemplary system in FIG. 5A, a drop event or other potential hazard is determined by countermeasure system 40, for example with substantially free fall or tumbling motion in direction D. In response, actuator 45 may be directed to retain connector 54 within connector port 30, for example via a spring bias or electromagnetic actuator system configured to generate a coupling tension or retention force along arrow C, sufficient to overcome the combined weight and acceleration forces on housing 16 and device 10. As a result, device 10 may be suspended from cable 56, avoiding impact and redirecting the potential impact energy to a combination of connector port 30, connector 54, and cable 56.

Figure 5B:
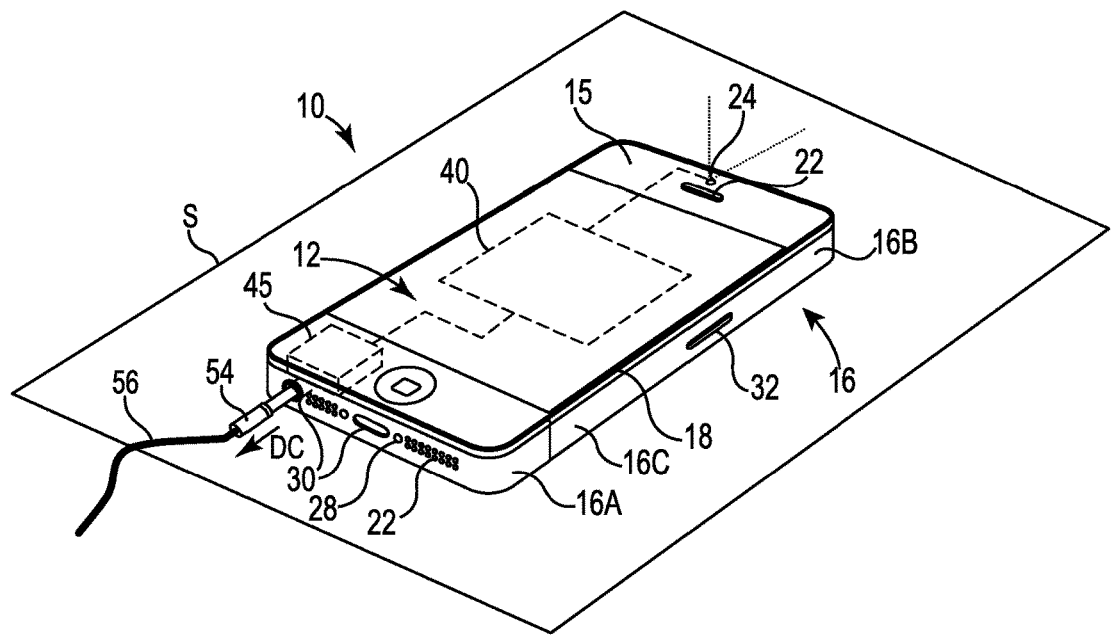
FIG. 5B is a schematic illustration showing a second example of the mechanically coupled countermeasure system, with an audio jack or connector decoupling.

FIG. 5B is a schematic illustration showing a second example of mechanically coupled countermeasure system 40, as shown in FIG. 5A, with audio jack or connector decoupling. In this example, countermeasure system 40 may indicates little or substantially no motion D, for example with device 10 positioned on (e.g., substantially horizontal) surface S.

In operation of the exemplary system in FIG. 5B, actuator 45 may be configured to release connector 54 from port 30, for example in response to a decoupling force in the direction of arrow DC. Decoupling device 10 from connector 54 and cable 56, in turn, reduces the risk of damage by preventing device 10 from being pulled off surface S.

Figure 6:
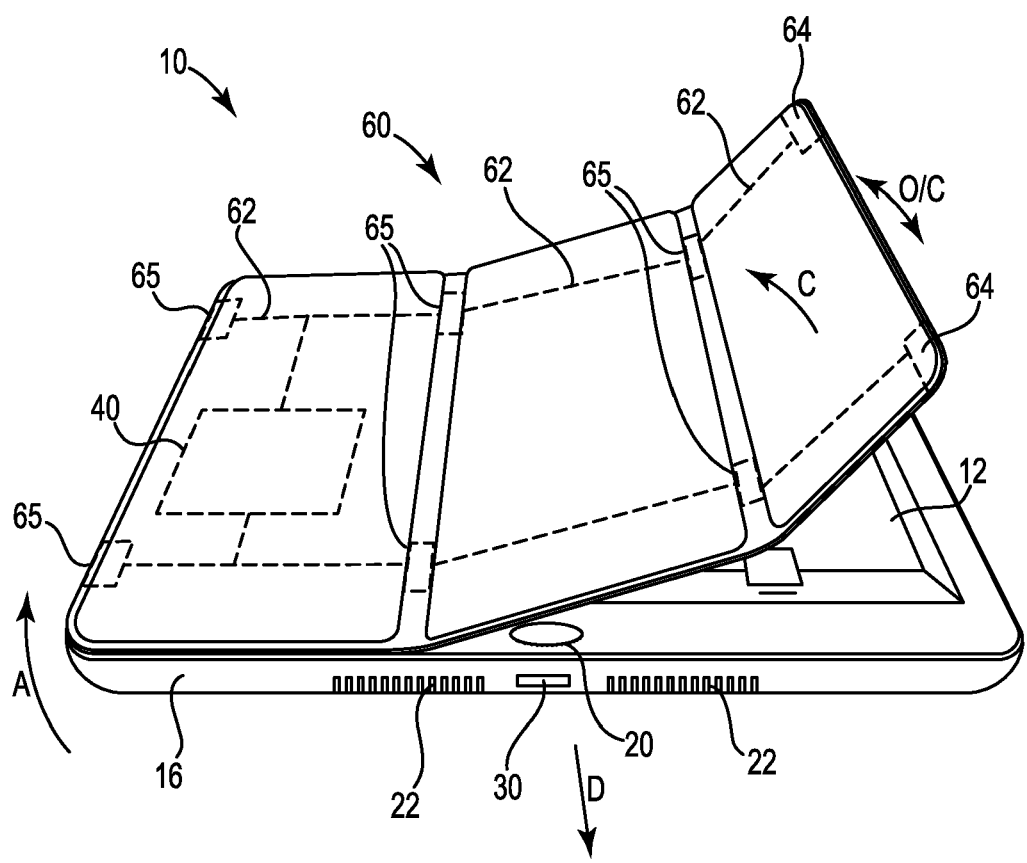
FIG. 6 is a front perspective view illustrating a mechanically coupled drop damage mitigation system for the device, with an actuated cover.

FIG. 6 is a front perspective view of electronic device 10 in an alternate embodiment, for example a media player, tablet computer, pad computer, or other computing device, or a computer monitor or display. In this particular configuration, device 10 is provided with a mechanically coupled drop damage mitigation system 40 utilizing actuated cover system 60, for example with one or more individual cover panels 62.

Cover system 60 is coupled to device housing 16, for example using a magnetic or mechanical coupling, and configured to protect cover glass 12 and other components of electronic device 10. Housing 16 may have a substantially single-piece configuration, for example with a unitary housing and frame assembly, formed together with the back cover of device 10.

Depending on application, the various components of countermeasure system 40 may be provided within device housing 16, cover system 60, or a combination thereof. For example, various sensor and processor components 24, 42, and 44 may be provided within housing 16 of electronic device 10, as described above, with various energy-absorbing elements 64 and memory metal or spring-operated cover actuator components 65.

Cover actuators 65 may be located between cover panels 62 of cover system 60, and/or between one or more cover panel(s) 62 and housing 16, as shown in FIG. 6. Alternatively, bimetallic strip or magnetically actuated mechanisms 65 may be provided, utilizing an electric current or voltage signal to generate or reverse a biasing force between adjacent cover panels 62, or between a cover panel 62 and device housing 16, in order to open or close one or more cover panels 62.

In operation of system 40, a drop or other potentially damaging event may be indicated by substantially free fall or tumbling motion D, with arbitrary rotational attitude A. In response, system 40 directs one or more cover actuators 65 to open or close cover panel(s) 62, for example by actuation of mechanical spring-bias elements 65, or utilizing electro-active or voltage-activated materials or memory metal actuator components 65. Additional electro-active polymers and other materials may also be utilized, for example by extending electro-active corner elements 64 outward from cover panel(s) 62 to redirect impact energy away from device 10 and cover glass 12 into energy-absorbing components 64, or other damping and shock absorbing materials within cover panels 62.

Adjacent cover panels 62 can also be rolled into a partially or fully coiled shock and impact-absorbing configuration, as shown in FIG. 6 (arrow C). For example, cover panel(s) 62 may be positioned in a closed, partially open, or coiled (curled) configuration, either adjacent cover glass 12 or the side or back surface of device 10. In addition, device 10 may be oriented so that cover system 60 lands first, and the impact energy is absorbed by shock absorbing (e.g., soft) materials of cover panels 62, or dedicated impact-absorbing elements 64.

Depending upon impact geometry, for example, cover system 60 can also be positioned in a spring-like energy absorbing or shock-absorber configuration, in order to increase the impulse time of the impact, and reduce the resulting forces and loads on device 10. Alternatively, one or more cover panels 62 can be flapped (actuated) open or closed (arrow O/C), either in a single motion or by repeated actuation, in order to slow the fall of device 10. Cover panels 62 may also be actuated or flapped to alter the rotational attitude A, in order to produce a more favorable impact orientation for device 10, and/or a more favorable energy absorbing configuration for cover panels 62.

Figure 7:
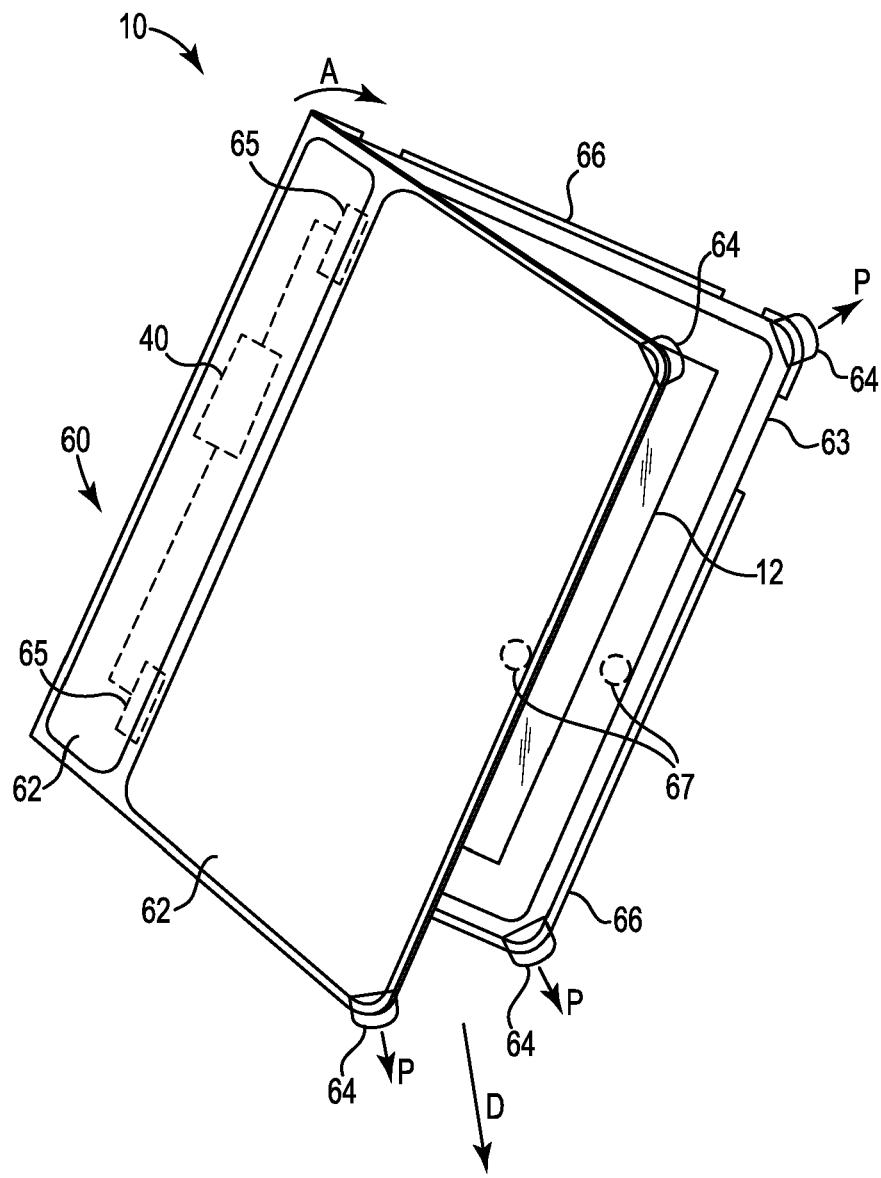
FIG. 7 is an alternate perspective view of the device, with a different cover configuration.

FIG. 7 is an alternate perspective view of electronic device 10. In this example, cover system 60 is configured as a case or enclosure system for a tablet-type computing device 10, with front cover panels 62 and back and side cover sections 63. Countermeasure system 40 includes actuated components 65, and cooperates with sensor and processor components in device 10 and/or cover 60 to open or close cover panels 62 based on a drop event or other potential hazard, as described above.

Alternatively, one or more cover panels 62 may be actuated or deployed in order to change the orientation of device 10 prior to impact, for example in order to orient device 10 to absorb impact energy in cover panels 62. Alternatively, internal or external mechanisms may be actuated to orient device 10 so that impact energy is absorbed by rear or side panels 63 of cover system 60, for example when cover panels 62 are absent.

In some designs, cover system 60 may also include actuated members 66 in one or more back or side panels 63, for example an expanding or contracting ring mechanism assembly 66 disposed about the periphery of cover 60, as shown in FIG. 7. On or more ring-type actuator elements 66 may be configured to deploy prior to impact, so that impact energy is redirected away from device 10 and cover glass 12, into energy-absorbing components 64 in ring actuator 66. Suitable deployment mechanisms for actuator elements 66 include spring bias, electromagnetic, and pneumatic actuators.

Additional actuated energy absorption elements 64 may also be provided, for example electro-activated elements 64, as described above, pneumatically actuated elements 64, and/or fluid-filled of fluid-actuated elements 64. In general, energy absorption elements 64 can be positioned or actuated to project in a proud relationship with respect to device 10, and the adjacent components of cover system 60 (arrows P), in order to absorb impact energy. In some applications, a magnetorheological (MR) fluid may also be utilized, whereby the damping and energy-absorption characteristics of individual members 64 can be selected based on the velocity and orientation (or attitude) of device 10, and other impact geometry data, for example using a magnetic signal to alter the viscosity of the MR fluid.

One or more energy absorbing elements 64 may also be formed of a durable energy-absorbing material such as fiberglass, a rubber or silicon based material, or a composite material with suitable damping and shock absorbing properties. In these embodiments, energy-absorbing members 64 may be distributed in various locations within cover panels 62 and side and rear panels 63, for example in different corner and edge locations of cover system 60, as shown in FIG. 7. In additional embodiments, one or more panel sections 62 and/or 63 of cover system 60 may be formed in whole or in part of fiberglass, rubber, silicon, impact foam, or other suitable energy-absorbing composite material, or such materials may be used to line the edges or corners of panels 62 and 63, proud of device 10, in order to redirect impact energy away from device 10 into cover system 60.

Auxiliary electromagnets 67 can be utilized to hold cover panels 62 in place, in the event that device 10 is dropped. In these examples, mitigation system 40 may be configured to actuate auxiliary electromagnets 67 when a drop event or other hazard is indicated, providing additional magnetic force to hold cover system 60 closed over cover glass 12, redirecting impact energy away from device 10 and into energy-absorbing components 64.

Figure 8:
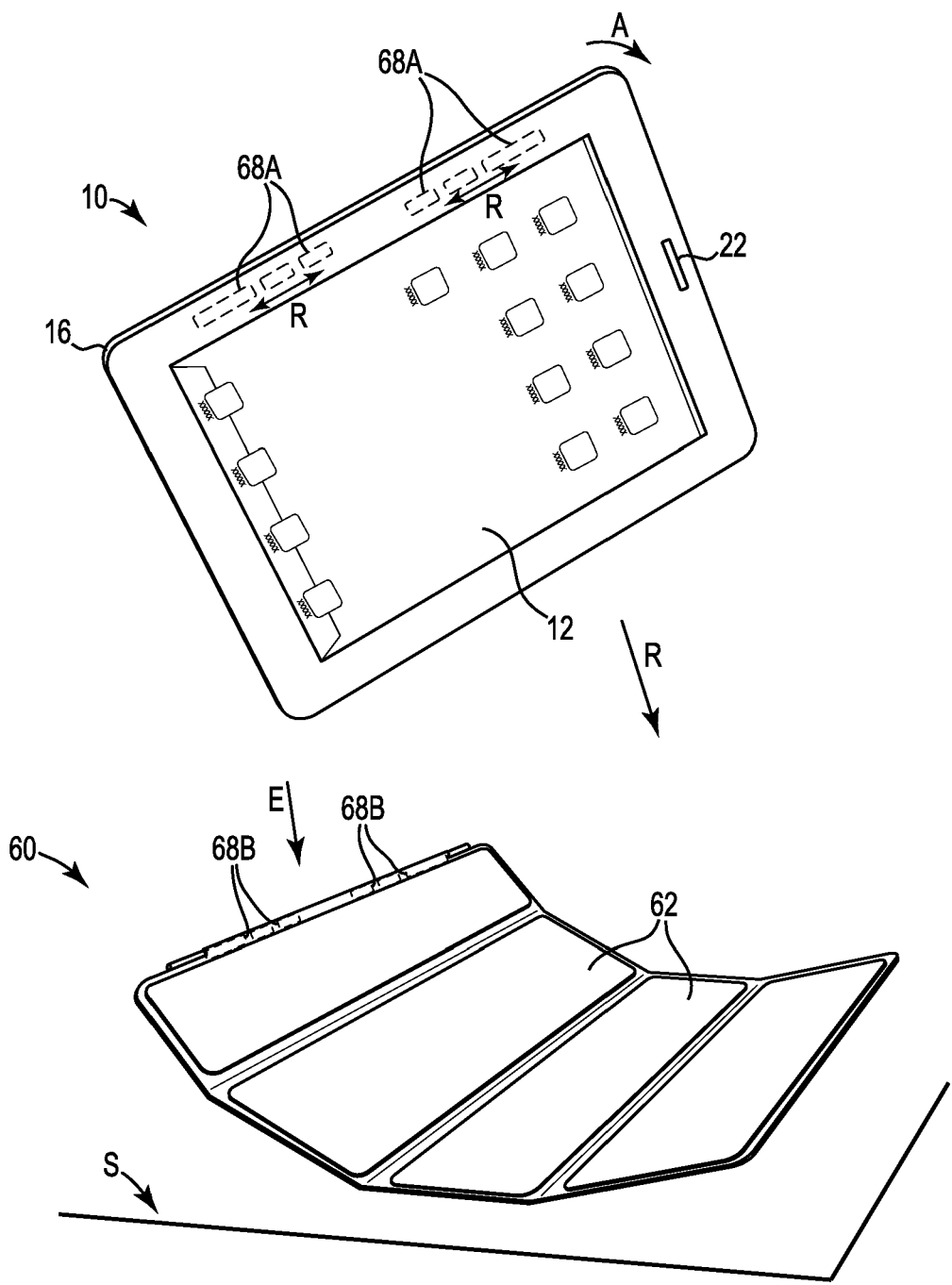
FIG. 8 is a perspective view of the device, with the cover in an ejected position.

FIG. 8 is a perspective view of device 10, with cover system 60 in an ejected position. In this configuration, device 10 is operable to eject one or more cover panels 62 (or 63) of cover 60, for example by reversing the polarity of cover coupling electromagnets 68A or 68B, or by repositioning or rotating (flipping) internal magnets 68A and/or magnets 68B. Based on the orientation A of device 10 and the proximity of any potential contact surface S, cover system 60 can also be ejected so as to reach surface S before device 10, redirecting impact energy away from cover glass 12 and other sensitive components by cushioning the (later) impact of device 10 with cover system 60.

In particular applications, magnets 68A and 68B may be arranged with alternating (and complementary) polarity, so that a relatively small (e.g., linear) repositioning of internal device magnets 68A (arrow R) with respect to external (cover) magnets 68B results in a substantial repulsive force, ejecting cover system 60 (arrow E). Alternatively, electromagnetic devices 68A or 68B may be used, in order to change the relative field polarity based on a current signal.

Additional drop damage mitigation techniques are also contemplated. For example, audio devices such as speakers 22 can be driven or actuated to generate one or more air pulses prior to impact. In this configuration, audio devices 22 may act as an air brake to reduce impact velocity, for example when utilized just prior to a face-drop type impact. Alternatively, one or more audio devices 22 may be actuated to generate audio pulses for increasing the impulse time, and thus to reduce the impact forces and stress loading on device 10.

An ejected cover system 60 may further be configured to reduce impact velocity via magnetic interactions with device 10. In these applications, any number of cover magnets 68A and/or diamagnetic materials may be distributed in cover panels 62 to generate an opposing field with respect that of internal magnets 68A of device 10, as distributed about the perimeter or along the front and back surfaces of housing 16 and/or cover glass 12. Cover panels 62 may also include magnetic, ferrous, or ferromagnetic materials, allowing device 10 to determine the relative position, velocity, and field orientation of cover system 60 via a magnetic field sensor 42, as described above.

Device 10 may also actuate internal magnets (e.g., electromagnet or rotating permanent magnets) 68A to generate an opposing field, with respect to that of ejected cover system 60, in to order to reduce impact velocity. Alternatively, cover panels 62 may utilize diamagnetic materials, in order to generate an inherently opposing field configuration, with respect to that of device 10. Device 10 may also actuate various internal magnets 68A to generate fields of either polarity, in order generate torque on device 10 by magnetic interaction with ejected cover system 60. In particular, this allows device 10 to produce a more favorable impact attitude A, via magnetic interaction with the corresponding fields of the magnetic components in cover panels 62.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

What is claimed is:

1. An electronic device, comprising:
   a housing;
   a sensor mounted in the housing;
   a processor in the housing, wherein the processor is configured to determine when the electronic device has been dropped based on data from the sensor;
   a component aligned with an unstable inertial axis of the housing; and
   an actuator mounted in the housing wherein, in response to the processor determining that the electronic device has been dropped, the actuator is configured to move the component to adjust an attitude of the housing to avoid impact with a portion of the housing.

2. The electronic device defined in claim 1 wherein the sensor is a motion sensor and wherein the processor is configured to determine when the electronic device has been dropped based on data from the motion sensor.

3. The electronic device defined in claim 2 wherein the motion sensor is an accelerometer.

4. The electronic device defined in claim 2 wherein the motion sensor is a gyroscope.

5. The electronic device defined in claim 2 further comprising:
   a proximity sensor wherein, in response to determining that the electronic device has been dropped, the processor is configured to determine a distance between the electronic device and an external surface based on data from the proximity sensor.

6. The electronic device defined in claim 5 wherein the actuator comprises a linear actuator and wherein, in response to the processor determining the distance between the electronic device and the surface, the linear actuator is configured to move the component linearly to change a rotational velocity of the housing.

7. The electronic device defined in claim 5 wherein the actuator comprises a rotational actuator and wherein, in response to the processor determining the distance between the electronic device and the surface, the rotational actuator is configured to rotate the component to change a rotational velocity of the housing.

8. The electronic device defined in claim 5 wherein, in response to determining that the electronic device has been dropped, the processor is configured to predict an impact geometry based on the data from the motion sensor and the data from the proximity sensor.

9. The electronic device defined in claim 1 wherein the component comprises an electronic device component selected from the group consisting of: a camera lens, a speaker element, a vibration motor, and a disk drive.

10. The electronic device defined in claim 9 wherein the actuator is configured to reposition the electronic device component to alter an attitude of the housing.

11. An electronic device, comprising:
a housing;
a motion sensor in the housing;
a mass mounted in the housing and aligned with an unstable inertial axis of the housing; and
an actuator mounted in the housing wherein, in response to a measurement from the motion sensor, the actuator is configured to move the mass relative to the unstable inertial axis to adjust an attitude of the housing.

12. The electronic device defined in claim 11 further comprising:
a processor in the housing, wherein the processor is configured to determine when the electronic device has been dropped based on data from the motion sensor and wherein the actuator is configured to move the mass in response to the processor determining that the electronic device has been dropped.

13. The electronic device defined in claim 12 wherein the motion sensor comprises a sensor selected from the group consisting of: an accelerometer, a gyroscope, and a magnetic sensor.

14. The electronic device defined in claim 13 further comprising:
a proximity sensor wherein, in response to determining that the electronic device has been dropped, the processor is configured to determine a distance between the housing and an external surface based on data from the proximity sensor.

15. The electronic device defined in claim 14 wherein the proximity sensor comprises an additional sensor selected from the group consisting of: a camera, an infrared sensor, and an ultrasonic sensor.

16. The electronic device defined in claim 15 wherein the actuator is configured to move the mass to rotate the housing in response to the measurement from the motion sensor and in response to an additional measurement from the proximity sensor.

17. An electronic device comprising:
a housing;
a motion sensor mounted in the housing;
a component in a portion of the housing;
a processor in the housing, wherein the processor is configured to determine when the electronic device has been dropped based on data from the motion sensor;
a mass coupled to an unstable inertial axis of the housing; and
an actuator coupled to the mass, wherein the actuator is configured to move the mass to adjust an attitude of the housing to avoid impact with the portion of the housing having the component when the processor determines that the electronic device has been dropped.

18. The electronic device defined in claim 17 wherein the actuator is a linear actuator and wherein, in response to the processor determining that the electronic device has been dropped, the linear actuator is configured to move the mass linearly to adjust an angular momentum of the housing.

19. The electronic device defined in claim 18 wherein the linear actuator is configured to pulse the mass repeatedly to adjust the angular momentum of the housing.

20. The electronic device defined in claim 17 wherein the actuator is a rotational actuator and wherein, in response to the processor determining that the electronic device has been dropped, the rotational actuator is configured to rotate the mass to adjust an angular momentum of the housing.

* * * * *